United States Patent [19]
Stout

[11] 3,953,735
[45] Apr. 27, 1976

[54] RADIATION SENSING DEVICE

[75] Inventor: Karl J. Stout, Lyndhurst, Ohio

[73] Assignee: Ohio Nuclear, Inc., Solon, Ohio

[22] Filed: Oct. 15, 1974

[21] Appl. No.: 514,331

Related U.S. Application Data

[63] Continuation of Ser. No. 370,163, June 14, 1973, which is a continuation-in-part of Ser. No. 269,046, July 5, 1972, abandoned.

[52] U.S. Cl. .............................. 250/363 S; 250/252; 250/369
[51] Int. Cl.² .......................................... G01T 1/20
[58] Field of Search ................. 250/366, 369, 363 S

[56] References Cited
UNITED STATES PATENTS

| | | | |
|---|---|---|---|
| 3,011,057 | 11/1961 | Anger | 250/366 |
| 3,697,753 | 10/1972 | Martone et al. | 250/369 |
| 3,732,419 | 5/1973 | Kulberg | 250/366 |
| 3,851,177 | 11/1974 | Dijk | 250/369 |

Primary Examiner—Harold A. Dixon
Attorney, Agent, or Firm—Fay & Sharpe

[57] ABSTRACT

A radiation sensing device including a collimator, a disc-shaped scintillation crystal in close proximity thereto; at least three substantially parallel photomultiplier tubes adjacent to one side of the scintillator and circuitry for locating a scintillation in the crystal. In particular, the circuitry includes a diode bias to correct for distortion and non-uniformity which results from placing the photomultiplier tubes adjacent to the scintillator.

20 Claims, 7 Drawing Figures

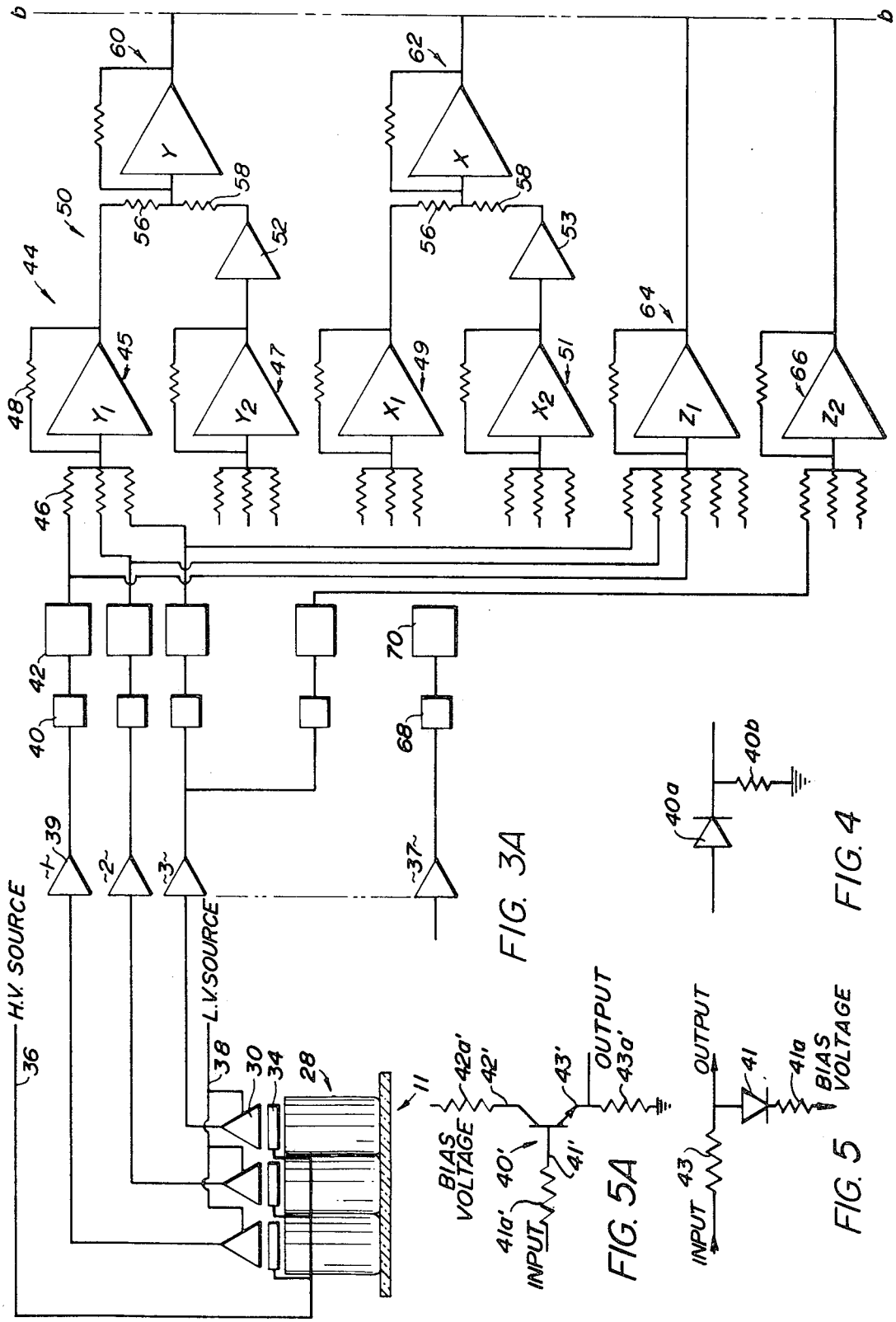

RADIATION SENSING DEVICE

This application is a continuation of application Ser. No. 370,163, filed June 14, 1973 which is a continuation-in-part of application Ser. No. 269,046, filed July 5, 1972. now abandoned.

BACKGROUND OF THE INVENTION

Diagnosis of tumors and other diseased tissues has been greatly facilitated by the advent of nuclear medicine. For example, small amounts of radioisotopes, after being administered to a patient, concentrate differently in diseased and healthy tissues. The different concentrations of radiation, usually gamma rays, emitted by the healthy and diseased tissues are thus distinct and can be detected. The machines used to detect the radiation usually utilize a collimator to direct or transmit radiation to a scintillation crystal which changes the radiation to visible light during a scintillation. Photomultiplier tube or tubes detect the light and various means are used to locate the scintillations in the scintillator and, thus, indirectly find a tumor or other irregularity in the patient.

Radiation imaging devices include dynamic and static machines sometimes called scanners and cameras, respectively. Both machines have inherent limitations. The scanners move slowly over the patient and are considered to have better resolution and field uniformity. However, because scanners take a relatively long time to detect the radiation, they create some patient discomfort. A static imaging device, on the other hand, is relatively fast because it takes a single stationary picture. While faster than the scanner, it does not give as good resolution and field uniformity as the scanner. Resolution is used herein to mean the ability of the machine to distinguish two spaced points or line sources of radiation.

An example of a static imaging device is shown in Anger U.S. Pat. No. 3,011,057, the disclosure of which is incorporated by reference. The Anger device operates by spacing the photomultiplier tubes away from the scintillator so that the photomultiplier tubes view overlapping areas of the crystal. The spacing, however, causes the failure of some photons to be detected by the photomultiplier tubes and a loss in resolution results.

This invention seeks to overcome the disadvantage of both the scanner and static imaging device. Basically, this invention uses a plurality of photomultiplier tubes, not less than three and normally 19 or 37, which are placed in a hexagonal array substantially adjacent to the scintillator. In this location, the photomultiplier tubes receive the maximum number of photons but problems do occur. Spatial distortion and non-uniformity of the response of the scintillator result. Rather than back the photomultiplier tubes away from the crystal to avoid the problems, as was done in the device shown in the above-mentioned patent, spatial distortion and non-uniformity are corrected electronically. As a result of the combination of electronic distortion correction and maximum photon reception, resolution is vastly improved.

SUMMARY OF THE INVENTION

This invention relates to a radiation sensing device having a means for forming a visible response from radiation, a means for converting the visible response to electrical impulses including at least three substantially parallel photomultiplier tubes positioned adjacent to and on one side of the means for forming in order to view the radiation and to give electrical response thereto, and means for operating on the electrical responses to create a signal which gives an indication of the relative location of the radiation.

DESCRIPTION OF THE DRAWINGS

FIGS. 3a and 3b are block diagrams of the circuitry (the Figures join along match lines a—a and b—b).

FIG. 4 is a discriminating means to eliminate unwanted signals.

FIG. 5 is a diode biasing device to correct electrical signals.

FIG. 5a is a transistor to attenuate electrical signals.

DETAILED DESCRIPTION OF THE DRAWINGS

Figure 1:
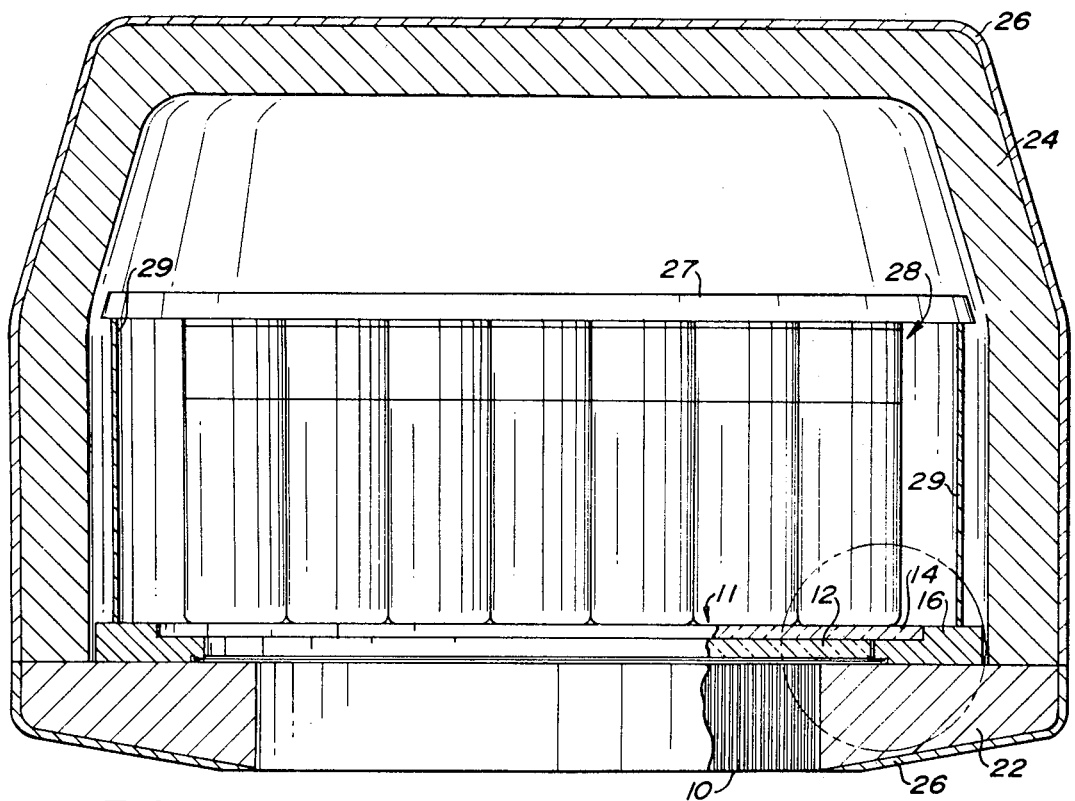
FIG. 1 illustrates a cross-sectional view of the head of the static imaging device of this invention.
Figure 2:
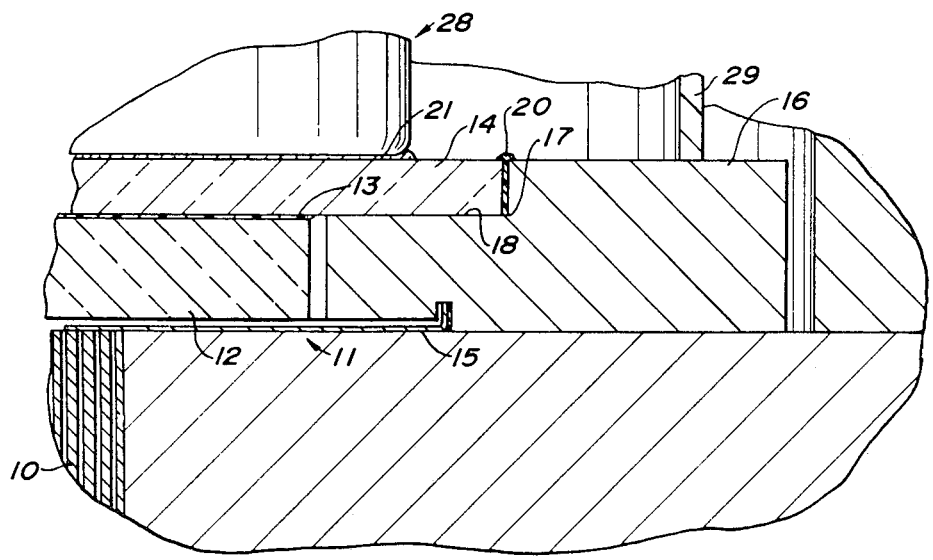
FIG. 2 is an enlarged view of the circled area of FIG. 1.

As illustrated in FIGS. 1 and 2, a means for forming a visible response from radiation includes a straight hole collimator 10 and a scintillator 11 immediately above it. Collimators of different types such as a pinhole collimator may be also used. As noted in more detail in FIG. 2, the scintillator 11 includes a relatively thin circular scintillation crystal 12 of about ½ inch thickness which is adhered by means of an epoxy 13 to a thin glass plate such as pyrex 14. Thicknesses of ¼ to ½ inch have been found satisfactory for the glass plate. The scintillation crystal changes invisible radiation such as gamma rays to visible radiation (photons). The glass 14 is suspended by a metal ring 16 having an annular right angle groove 17 forming an annular seat 18 on which the glass rests and thereby supports the scintillation crystal 12. An adhesive 20, such as an epoxy, holds the glass 14 in contact with the metal ring 16 and forms a hermetic seal. The lower face of the crystal 12 is protected by a thin aluminum sheet 15. Sheet 15 has an upwardly extending peripheral flange which is epoxy bonded in a recess formed in ring 16. The sheet 15 is slightly spaced from the face of the crystal.

Gamma rays from outside the field of view are eliminated by lead shielding 22. Additional lead shielding 24 around the complete interior portion of the head assembly prevents the entrance of stray radiation. A casing 26 surrounds and supports the entire lead shielding.

The scintillator is a type that is commercially available from different manufacturers. The glass and metal ring support is required by the manufacturer in order to provide adequate structural support. Any support between the crystal 14 and the collimator 10 would interfere with the gamma rays. Moreover, the crystal is fragile and cannot be supported only around its periphery.

Means for converting the radiation to electrical impulses includes a hexagonal array of photomultiplier tubes 28. In the hexagonal arrangement shown in cross-section in FIG. 1, there are 37 two inch photomultiplier tubes viewing the scintillator 11. The photomultiplier tubes 28 are arranged in a hexagonal configuration since it permits the maximum number of photomultiplier tubes on a circular crystal. The array of photomultiplier tubes 28 is enclosed by a cylindrical light shield 29 formed from sheet metal. A hold down plate 27 is releasably connected to the top of the shield.

As noted in FIG. 1, the photomultiplier tubes 28 are placed substantially adjacent to the scintillator 11 with only a standard optical coupling grease 21 therebetween. Substantially adjacent, as used herein, means a distance from the scintillator where spatial distortion is a problem. In this manner, the photomultiplier tubes sense a maximum number of photons given off by the scintillator 11. Only the glass 14, which is about 1/4 inch thick, separates the scintillation crystal 12 from the face of the photomultiplier tubes 28. This 1/4 inch glass is only necessary to support the crystal and is required by the crystal manufacturer. It is not intentionally placed between the photomultiplier tubes and the scintillation crystal 12 for the purpose of spacing.

It is possible to use a smaller or larger number of photomultiplier tubes depending on the size of the scintillator. The photomultiplier tubes are commercially availble from RCA Corporation or Space Research Corporation. It is also possible to use a single photomultiplier tube having a photocathode and a plurality of electron multipliers.

The photomultiplier tubes are placed parallel to each other and view one side of the scintillator 11. As placed with their faces immediately adjacent to the scintillator, there is very little or no view of the overlapping areas of the scintillator 11. It is only necessary that the photomultiplier tubes are positioned in such a manner in order to have three of the photomultiplier tubes view a common scintillation. That is, at least three tubes must see each scintillation in order to provide the necessary basis to locate its position. As noted earlier, this configuration of having the photomultiplier tubes immediately adjacent the scintillator provides for the maximum reception of photons and, therefore, enables a best possible resolution.

The means for operating on the electrical responses create a signal which gives an indication of the relative location of the radiation and refers, in general, to all of the circuitry involved. The circuitry involves all the preamplifiers, dividers, amplifiers and hereinafter described circuitry. It should be understood that variations will be obvious to one skilled in the art.

Figure 3B:
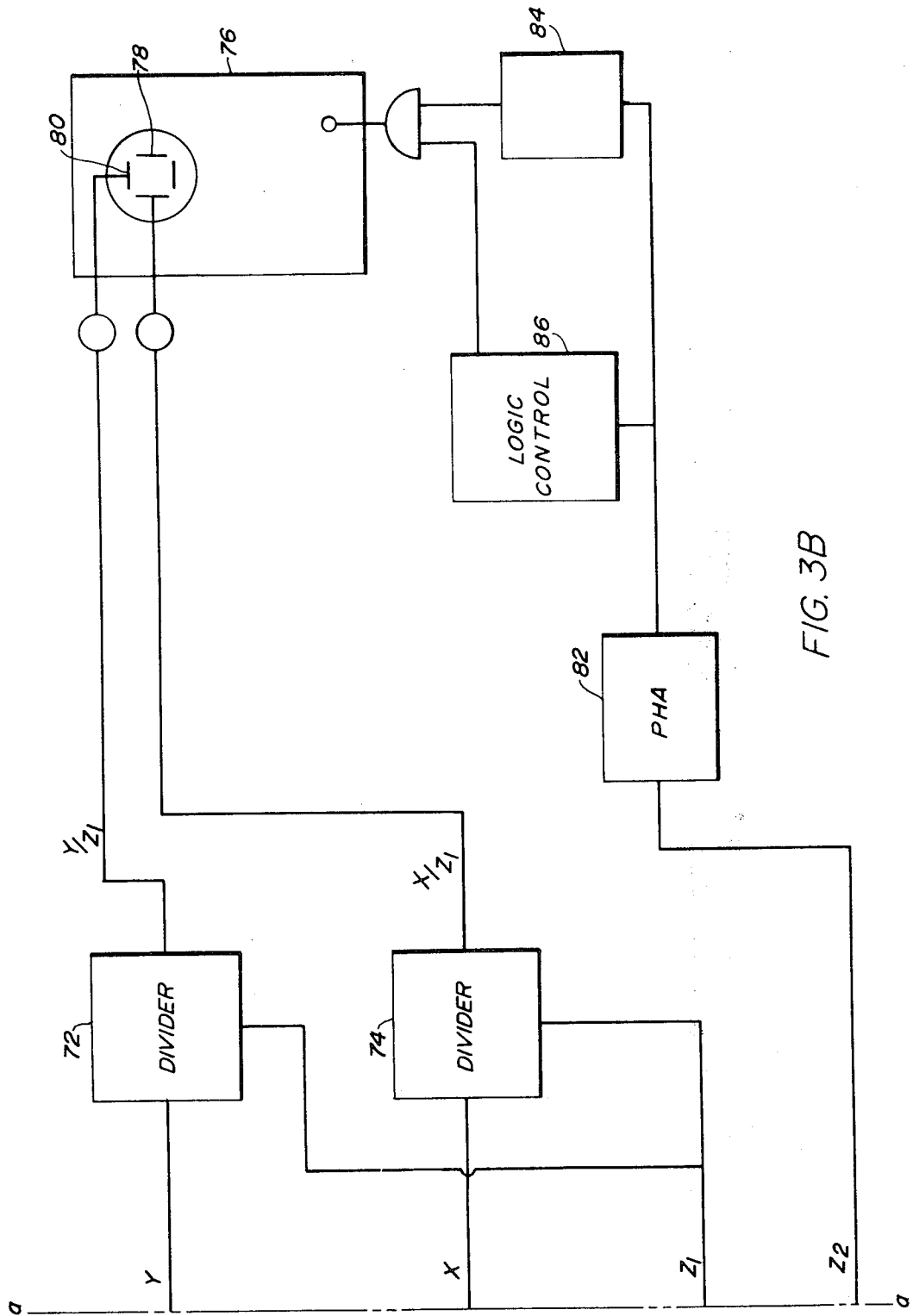

A block diagram in FIGS. 3a and 3b showing the major components illustrates that the photomultiplier tubes 28 are connected to resistor divider networks 34 which are fed by a high voltage source 36. The high voltage source is variable depending on the isotope that is used with the camera or static imaging device as it is alternately called. Preamplifiers 30 receive signals from the photomultiplier tubes and are attached to a low voltage source 38. The preamplifiers 30 provide signals to delay line amplifiers 1 through 37. The incoming pulses to the delay line amplifiers are about 3 volts and have a relatively fast rise time of about 750 nanoseconds and an output decay time in the order of about 35 microseconds. The delay line amplifiers 39 shape the pulses so that it has a flat top with a duration of about 2 microseconds. The height of the top of the square wave is directly proportional to the peak of the original pulse. The delay line amplifiers are used in order to give the circuitry time to operate on the pulses and reduce the effects of pulse pile up at high pulse rates. Delay amplifiers have been found preferable to simple pulse stretchers since they reduce dead time. Dead time is defined as the time between signals to which the circuitry can respond. The use of delay amplifiers has permitted dead time as small as 2 microseconds.

Operatively connected to the delay amplifiers output is an initial discriminator 40 which is shown in detail in FIG. 4. Diode 40a is placed in series with the line signal and is grounded by a resistor 40b. The diode 40a is simply used to discriminate against noise or very small signals. The threshold voltage of the diode prevents any signal from passing through it until it is of a predetermined value. By discriminating against small signals, utilization is made of only the relatively strong signals which can be used to determine the position of the scintillation in the scintillator with more accuracy. Operatively connected to the initial discriminator 40 is a means for correcting distortion which results from placing the photomultiplier tubes adjacent to the scintillator. This means for correcting distortion 42 is a non-linear circuit and is illustrated specifically in FIG. 5 and includes an input including a resistor 43 of about 100 ohms, a diode 41 having about 0.6 volts threshold voltage and a resistor 41a of about 60 ohms which leads to a bias voltage in the area of 0.2 volts. The values given are typical values and will vary somewhat. The diode 41 and resistor 41a are placed in parallel with the output from the diode of the biasing unit. Any voltage at the input has its current pass through resistor 40b. If the voltage is not above the threshold value of the combined bias and threshold voltage, no current passes through the diode 41. At this point, the output will be directly proportional to the input. As the input voltage is increased, a value is reached where the diode 41 becomes forward biased. At this point, current flows through the diode 41 and resistor 41a and the output voltage is not directly proportional to the input voltage. That is, the ratio of the output to input or gain is less above the threshold value than below it. Threshold value is used herein to mean a place or area where the gain changes. Thus, the diode 41 and resistor 41a become an attenuating factor in the circuit. The bias voltage is adjustable and may be used to vary the output of the photomultiplier tubes that is transmitted in the circuitry. By using a variable bias voltage, spatial distortion and non-uniformity of the field can be virtually eliminated whether the photomultiplier tubes are adjacent or spaced from the scintillation crystal.

Non-linear response circuits other than a diode bias could be used to correct for distortion and non-uniformity of field.

Another non-linear response circuit is illustrated in FIG. 5a and is a transistor 40'. It performs the functions of discriminating against small signals or noise and attenuating the signals above a predetermined level. It is an alternate to both components shown in FIGS. 4 and 5. It includes a base 41' having a resistor 41a' in series therewith. A collector 42' has a resistor 42a' in series therewith and an emitter 43' has a resistor 43a' in series therewith. While the values may vary, the base resistor 41a' is about 100 ohms, the collector resistor 42a' is about 600 ohms and the emitter resistor 43a' is about 65 ohms.

A bias voltage is applied to the collector of about 3 volts. For signals up to the threshold bias value of 300 millivolts at the input no signal will appear at the emitter output. The transistor acts as a discriminator against small signals or noise. After a 300 millivolt voltage is exceeded at the input, the emitter output will have a signal equal to the input minus the 300 millivolt value. The transistor functions as an emitter follower in this input range. As the input voltage further increases and approaches the bias voltage, the collector 42 of the transistor can no longer supply current and the input signal becomes attenuated by the voltage divider action of resistors 41a and 43a. That is, the transistor operates in a known saturation mode for the signals above a combined threshold and bias voltage. This last phenomenon is similar to the action of the diode bias circuit of FIG. 5. Other configurations using diodes and transistors are possible to achieve the effect desired. It is with this addition to the circuitry that the herein described invention utilizes both the maximum number of photons to obtain the best possible resolution and eliminates distortion and nonuniformity of field.

Operatively connected to the diode bias device 42 are summing circuits 44. Summing circuits 44 include subgroup summing amplifier 45 which has input resistors 46 having values of about 5 to 40K ohms and resistor 48 which has a value of about 5K ohms. By way of example, the subgroup summing amplifier 44 for the $Y_1$ signal includes inputs from the photomultiplier tubes on one side of the X axis. For convenience, this shall be noted as the $Y_1$ summing amplifier. Shown in a representative fashion are the summing amplifiers for the $Y_2$ signal, the $X_1$ signal and $X_2$ signal. These subgroup summing amplifiers receive signals from the photomultiplier tubes on either side of the X and Y axis. In particular, the $Y_1$ and $Y_2$ summing amplifiers receive signals from the photomultiplier tubes on either side of the X axis. The $X_1$ and $X_2$ summing amplifiers receive signals from the photomultiplier tubes on either side of the Y axis.

The term subgroup summing amplifiers is used to refer generally to the summing amplifiers 45, 47, 49 and 51. In addition to the elements referred to generally as 50, these elements include inverters 52 and 53 and summing amplifiers 60 and 62. The inverters 52 simply change the signal of $Y_2$ and $X_2$ to a negative value before adding them to $Y_1$ and $X_1$, respectively. The usual type resistors 56 and 58 are utilized in the summing amplifiers and have a value of about 5K ohms.

Summing amplifiers 60 and 62, respectively, further combine the signals in a coordinate signal of the Y and X position of the scintillation occurring in the scintillator 11. The photomultiplier tube in the center of the hexagonal array is not operatively connected to the subgroup summing amplifiers. Moreover any photomultiplier tubes which may be on the X axis are not used to determine the Y coordinate position.

The means for operating on the electrical responses further include the first and second total summing amplifier. The first total summing amplifier 64 is similar to the others described above except that it is operatively connected to all of the photomultiplier tubes. It sums all of the signals after they have been corrected by means of the diode bias device 42, but before they pass into the subgroup summing amplifiers. The resultant signal is referred to as a Z signal.

A second total summing amplifier 66 similarly sums all of the outputs from all of the photomultiplier tubes and gives a $Z_2$ signal. The second total summing amplifier 68 receives its signal from a point before the initial discriminator 40 but after the delay line amplifiers. Separate diode bias devices 70 (similar to that previously described as 42) is used in conjunction with the second total summing circuit.

As illustrated in FIG. 3b, the Y, X, $Z_1$ and $Z_2$ signals are then transmitted in the circuitry. In particular, the Y and X signals are transmitted to divider circuits. The divider circuits are well known elements which take two inputs and divides them. The purpose of the divider circuits is to normalize the coordinate signals and are referred to herein as means for normalizing the Y and X signal to make them independent of the intensity of the scintillation. As illustrated in FIG. 3b, the Y and X signals are divided by the output of the first total summing amplifier which is the $Z_1$ output signal. Thus, the Y and X signals are divided by a denominator which is proportional to the total energy of the scintillation and thus are normalized or made independent of such energy. From the divider circuits, the normalized coordinate signals are then transmitted to the X and Y axis of an oscilloscope 76 having plates 78 for the X axis and plates 18 for the Y axis.

The $Z_2$ signal, which is proportional to the total energy level of the signals viewed by the photomultiplier tubes, is passed through a pulse height analyzer 82. The pulse height analyzer 82 determines the acceptable energy levels of the pulses and is operatively connected to the oscilloscope 76. If the signal is acceptable by the pulse height analyzer, it travels to a Z axis driver 84 which is simply a well known element to give a specific time duration to the acceptable pulse. If desired, a logic control 86 may be utilized in the circuit to either give a specific time period for the circuit to operate or to count the number of scintillations before it turns itself off. The $Z_2$ signal is then directed into the oscilloscope 76. The oscilloscope is the means for receiving the signal and translating it into a dot on the scope to give its relative location in the scintillator.

In operation, a radioisotope is given to a patient which forms a radioactive pattern. The radiation, usually gamma rays, pass through the collimator 10 to the scintillator 11. The gamma radiation is thereby changed to visible radiation and is noted by the adjacent photomultiplier tubes. The photomultiplier tubes give electrical signals which are somewhat distorted as a function of position because of the photomultiplier tubes' immediate proximity to the scintillator. In other words, the relation of the electrical impulses to the location of radiation in the scintillator is distorted or non-linear. Means for operating on the electrical responses includes appropriate amplifiers and in particular a diode bias which gives a non-linear response to an input. The diode bias may be adjustable and is used to remove spatial distortion and non-uniformity of field by varying the output of the photomultiplier tubes to accurately reflect the location of the scintillation. Subgroup summing circuits are operatively connected to the diode biasing means and give a coordinate signal of the location of the scintillation in the scintillation crystal. Coordinate signals are normalized by dividing into them the resultant output of a total summing amplifier. It is recognized and understood that other well known means may be used for summing the output of the photomultiplier tubes and for normalizing them. A second total summing amplifier is used as a pulse height analyzer so that only desirable signals are utilized to trigger the oscilloscope. By use of the radiation sensing device in the invention, an image placed on the scintillation crystal can be reproduced as an image on the oscilloscope. It is further understood that various electronic devices may be used to give a display other than an oscilloscope.

Other changes in the circuitry and in the display means will be obvious to one skilled in the art, and should be considered a part of this invention.

I claim:

1. A radiation sensing device for producing positional information that is an accurate indication of the location of radiation comprising:

means for forming a visible response from radiation;

means for converting the visible response from radiation to electrical impulses including at least three photomultiplier tubes positioned substantially adjacent to and on one side of the means for forming in order that the photomultiplier tubes receive radiation, view common radiation and give electrical impulses as a result thereof, the proximity of the photomultiplier tubes to the means for forming a visible response causing distortion of the relation of the electrical impulses to the location of the radiation;

means for operating on the electrical impulses operatively connected to the means for converting to create a signal which gives an accurate indication of the relative location of the radiation, the means for operating including a non-linear circuit which gives an output which is not directly proportional to an input signal in order to correct for the distortion, the means for operating including a biasing device for adjusting the gain about a predetermined threshold value, the gain being less above the threshold value than below it.

2. The radiation sensing device of claim 1 wherein the non-linear circuit includes a biasing device having an input, an output and a bias voltage applied thereto.

3. The radiation sensing device of claim 2 wherein the non-linear circuit includes a resistance element through which current flows when the input exceeds a predetermined level with respect to the bias voltage in order to vary the output.

4. The radiation sensing device of claim 3 wherein the biasing device includes a semi-conductor that acts in conjunction with the resistance element and the bias voltage in order that current passes through the resistance element when the semi-conductor conducts and the input voltage exceeds a predetermined level with respect to the bias voltage thereby varying the output voltage.

5. The radiation sensing device of claim 4 wherein the non-linear circuit attenuates the larger signals relative to the smaller signals.

6. The radiation sensing device of claim 5 wherein the biasing device includes a transistor operatively connected to the photomultiplier tubes having a base, collector and emitter.

7. The radiation sensing device of claim 6 wherein the transistor has a threshold value which discriminates against small signals and noise.

8. The radiation sensing device of claim 7 wherein the bias voltage is applied to the collector and series resistors are connected to the base, collector and emitter.

9. The radiation sensing device of claim 4 wherein the biasing device includes a diode.

10. The radiation sensing device of claim 9 which further includes an initial discriminator operatively connected to and preceding the non-linear response circuit.

11. The radiation sensing device of claim 10 wherein the means for forming a collimator on the other side of the scintillator from the photomultiplier tubes; the scintillator including a scintillation crystal having a generally flat surface supported from a glass plate which is substantially adjacent to the photomultiplier tubes; and the means for operating further includes a means for receiving the signal which gives an indication of the relative location of the radiation and translating the signal into a visible indication thereof; and the photomultiplier tubes are arranged in subgroups of at least two photomultiplier tubes on each side of an X and Y axis in a plane substantially parallel to the flat surface of the scintillation crystal.

12. The radiation sensing device of claim 11 wherein the means for operating on the electrical responses include subgroup signal summing circuits operatively connected to each subgroup of photomultiplier tubes on either side of the X and Y axis, the subgroup signal summing circuits producing X and Y coordinate signals which are used to determine the X and Y coordinates of the visible radiation.

13. The radiation sensing device of claim 12 wherein the subgroup signal summing circuits are summing amplifiers and the means for operating on the electrical responses further includes a first total signal summing amplifier which is operatively connected to and takes the sum of all the outputs from the photomultiplier tubes to produce a first Z signal;

the means for operating further including a means for normalizing the X and Y coordinate signals by comparing them with the first signal to produce a normalized X and Y coordinate signal;

a second total signal summing amplifier which is operatively connected to and takes the sum of all the outputs from the photomultiplier tubes to produce a second Z signal;

a pulse height analyzer operatively connected to the second total summing amplifier; and the signal receiving and translating means operatively connected to receive the normalized X and Y coordinate signals and the second Z signal from the pulse height analyzer.

14. A radiation sensing device for producing positional information that is an accurate indication of the location of radiation comprising:

a collimator which transmits radiation;

a scintillator in close proximity to the collimator which converts radiation to visible radiation;

means for converting the visible radiation to electrical impulses on one side of the scintillator in order to view common scintillations therein and give electrical impulses in response thereto; the means for converting positioned substantially adjacent to and on one side of the scintillator in order that the means for converting receive radiation, the proximity of the means for converting to the scintillator causing distortion of the relation of the electrical impulses to the location of the radiation; and means for operating on the electrical impulses to create a signal which gives an indication of the relative location of the radiation, the means for operating operatively connected to the means for converting, and including a non-linear circuit to correct for the distortion which results from placing the means for converting substantially adjacent to the scintillator, the means for operating including a biasing device for adjusting the gain about a predetermined threshold value, the gain being less above the threshold value than below it;

circuits operatively connected to the non-linear response circuit in order to provide coordinate signals of the location of the scintillations in the scintillator;

means for normalizing the coordinate signals operatively connected to the circuits;

pulse selection means for selecting the range of signals to be investigated operatively connected in the radiation sensing device; and means for receiving normalized and pulse selected signals in order to produce an indication of the relative location of the scintillations.

15. The radiation sensing device of claim 14 wherein the scintillator is disc shaped and has generally flat sides.

16. The radiation sensing device of claim 14 wherein the means for converting includes at least three photomultiplier tubes.

17. The radiation sensing device of claim 16 wherein there are 37 2-inch diameter photomultiplier tubes arranged in a hexagonal array.

18. The radiation sensing device of claim 14 wherein the non-linear circuit is a diode bias device including a diode with a reverse voltage bias applied thereto.

19. The radiation sensing device of claim 14 wherein the subgroup summing circuits are summing amplifiers;

the means for normalizing includes a first total summing amplifier and dividers which divide the coordinate signals from the summing amplifiers by the output from the total summing amplifier to produce normalized signals; and a second total signal summing amplifier which is operatively connected to and taking the sum of the outputs from the means for converting and sends it to the pulse selection means.

20. The radiation sensing device of claim 14 wherein the means for receiving is an oscilloscope.

* * * * *

UNITED STATES PATENT OFFICE
CERTIFICATE OF CORRECTION

Patent No. 3,953,735      Dated APRIL 27, 1976

Inventor(s) KARL J. STOUT

It is certified that error appears in the above-identified patent and that said Letters Patent are hereby corrected as shown below:

All that portion of the term of Patent No. 3,953,735 subsequent to October 7, 1992, has been disclaimed.

Signed and Sealed this

Sixteenth Day of November 1976

[SEAL]

Attest:

RUTH C. MASON
*Attesting Officer*

C. MARSHALL DANN
*Commissioner of Patents and Trademarks*